United States Patent Office 2,861,088
Patented Nov. 18, 1958

2,861,088

11α,17α,21-TRIHYDROXY-4-PREGNENE-3,20-DIONE AND ESTERS THEREOF

Herbert C. Murray, Hickory Corners, and Durey H. Peterson, Kalamazoo, Mich., assignors to The Upjohn Company, Kalamazoo, Mich., a corporation of Michigan No Drawing. Application April 10, 1952
Serial No. 281,656

18 Claims. (Cl. 260—397.45)

This invention relates to a new compound, 11α,17α,21-trihydroxy-4-pregnene-3,20-dione ($\Delta^4$-pregnane-11α,17α-21-triol-3,20-dione), and to novel esters thereof and a process for the production of the same.

The novel compound of the invention has the following structural formula:

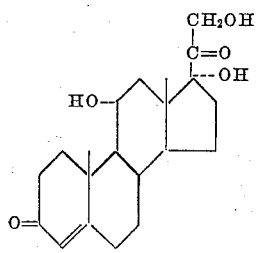

and is useful in producing esters according to the present invention which esters are readily purifiable forms and have utility in the synthesis of esters of cortisone.

It is an object of the invention to provide a novel compound 11α,17α,21-trihydroxy-4-pregnene-3,20-dione. Another object is the provision of novel esters thereof. A further object is provision of a process for making esters of 11α,17α,21-trihydroxy-4-pregnene-3,20-dione. Other objects will be apparent to those skilled in the art to which the invention pertains.

The novel esters of the invention are prepared from the novel 11α,17α,21-trihydroxy-4-pregnene-3,20-dione which in turn may be prepared from 17α,21-dihydroxy-4-pregnene-3,20-dione and the esters thereof by the oxygenating action of a culture of fungus of the order Mucorales as described in our applications of which this application is a continuation-in-part, Serial No. 180,496, filed August 19, 1950 (now abandoned), and Serial No. 272,944, filed February 23, 1952 (now Patent 2,602,769), or as described in the preparations following in this specification.

The microbiological oxygenation is carried out with the employment of an oxygenating fungus which is a species of a genus of a family of the order Mucorales or the oxygenating enzymes obtainable therefrom. Among the several families of this order, the genera of the families Mucoraceae and Choanephoraceae are of greatest utility, and, among the genera of these families of fungi, the Rhizopus, Cunninghamella, and Mucor have been found of greatest value in the method of the present invention. Species of these genera which are operative in the method of the invention include, for example, the Rhizopus species *microsporus, circinans, oligosporus, arrhizus, cohnii, oryzae, nigricans, chinensis, japonicus, tritici, kazensis, delemar, shanghaiensis, reflexus,* and synonymous species, which are in fact identical with those named although differently named, and the representative Mucor species *mucedo, griseo cyanus, hiemalis, hiemalis* var. *albus, rouxii, adventitius, christianiensis, circinelloides, dubius, genevensis, javanicus, microsporus, parasticus, gravensis, plumbeus, plumbeus* var. *spinesens, microsporus, ramannianus, racemosus,* and the like.

While species of genera of families of the order Mucorales, and especially those of the family Mucoraceae, are broadly operative in the method of the present invention as the oxidizing fungi, for reasons of economy and productivity, species of the genera Rhizopus and Cunninghamella are preferably utilized for production of optimum yields of 11,17α,21-trihydroxy-4-pregnene-3,20-dione, although in certain cases under particular circumstances the other genera and other species may be most advantageously employed. Species of these mentioned genera, however, in particular demonstrate pronounced steroid oxygenating activity, and are thereby able, according to the method of the invention, when suitably grown and contacted with 17α,21-dihydroxy-4-pregnene-3,20-dione, to accomplish oxygenation of the eleven position of the steroid on an industrially important scale.

Though species of certain genera of the fungi, of the genus Rhizopus in particular, the genus Cunninghamella, and the genus Mucor, all of which are of the families Mucoraceae and Choanephoraceae are practical for most abundant production of oxygenated steroids, and while economic considerations may confine preferred operation to certain species and strains possessing a distinctive physiological specificity, species of other families and genera of the order Mucorales are also operative for the production of oxygenated steroids in industrially significant quantities.

For example, other useful representative genera of the Mucoraceae family, and representative species thereof, as identified in H. Zycha, "Kryptogamenflora der Mark Brandenburg," Band VIa, 1–264 (1934) include Parasitella (*P simplex*), Zygorhynchus (*Z. heterogamus, Z. moelleri*), Circinella (*C. spinosa*), Actinomucor (*A. repens*), Pirella (*P. circinans*), Absidia (*A. reflexa, A. glauca*), Spinellus (*S. sphaerosporus*), Phycomyces (*Ph. blakesleeanus, Ph. theobromatus*), Sporodinia (*Sp. grandis*), Pilaira (*P. anomala*), Pillobolus (*P. crystallinus*), Dicoccum (*D. asperum*), Tieghemella (*T. orchidities, T. italica*). Other Mucorales families with their genera and representative species include Thamnidiaceae: Thamnidium (*Th. elegans*), Dicranophora (*D. fulva*), Chaetostylum (*C. fresenii*), Helicostylum (*H. piriforme*), Chaetocladium (*Ch. brefeldii*); Choanephoraceae: Blakeslea (*B. trispora*), Choanephora (*Ch. cucurbitarum*), Rhopalomyces (*Rh. elegans*), Cunninghamella (*C. elegans, C. verticulata*), Thamnocophalis (*Th. quadrupedata*), Mycotypha (*M. microspora*); Cepalidaceae: Piptocephalis (*P. preseniana*), Syncephalis (*S. reflexa, S. nodosa*), Spinalia (*Sp. radians*), Syncephalastrum (*S. racemosum, S. fulvium*), Dispira (*D. cornuta*), Coomensia (*C. pectinata*), Kickxella (*K. alabastrina*); Mortierellaceae: Mortierella (*M. pusilla, M. alpina*), Haplosporangium (*H. bisporale*), Dissophora (*D. decumbens*); Endogenaceae: Endogone (*E. reniformis*), Sclerocystis (*S. coromiodes*), Glaziella (*G. vesiculosa*).

Of the Rhizopus genus, species of which, as stated previously, are preferred in the method of the invention, according to H. Zycha, "Krypt. der Mark Brandenburg" Band VIa, 110–120 (1935), many commonly known species are synonymous. Thus *Rhizopus microsporus* may be known as *Rh. minimus, Mucor speciosus, Rh. speciosus,* and *Rh. equinus; Rhizopus circinas* may be known as *Rh. reflexus; Rhizopus oligosporus* may be known as *Rh. delmar* or *Rh. tamari; Rhizopus arrhizus* may be known as *Rh. nodosus, Rh. ramozus, Rh. maydis, Mucor arrhizus, Mucor norvegicus, Rh. pusillus, Rh. bovinus, Rh. cambodja, Rh. chinensis,* and *Rh. tritici; Rhizopus cohnii* may be known as *Rh. suinus; Rhizopus oryzae* may be known as *Rh. japonicus* or *Rh. tonkinensis; Rhizopus nigricans* may be known as *Mucor stolonifer, Rh. niger, Rh. artocarpi, Mucor niger, Rh. nigricans* vars. *minor*, or *Rh. nigricans* var. *luxurians;* and *Rhizopus echinatus* is itself a doubtful species which may be synonymous with *Rhizopus nigricans*.

Of the Cunninghamella genus, the species, *C. echinulata, C. bainieri, C. blakesleeana* (ATCC 9245), *C. elegans, C. verticulata,* and *C. berthollitiae,* among others, have been used. These Cunninghamella species and the *Mucor javanicus, Mucor adventitious auranticus, Mucor microsporus* (ATCC 8541) also demonstrate, in accordance with our processes, the oxygenation of 17α,21-dihydroxy-4-pregnene-3,20-dione.

The selected species of fungus of the order Mucorales is suitably grown on a medium containing available carbon, illustratively carbohydrates such as sugars or starches; assimilable nitrogen, illustratively soluble or insoluble proteins, peptones or amino acids; and mineral constituents, illustratively phosphates and magnesium sulfate; and other art recognized, desirable or adventitious, additions. The medium may desirably have a pH before inoculation of between about 4.5 and 5.9 although a higher or lower pH may be used.

Inoculation of the fungal growth-supporting medium with the selected fungus of the Mucorales order may be accomplished in any suitable manner. Growth of the fungus is readily promoted by maintaining incubation temperatures of about room temperature, e. g. twenty to twenty-eight degrees centigrade, but a relatively wide range of temperature is suitable.

The period of fungal growth required before the 17α,21-dihydroxy-4-pregnene-3,20-dione is exposed to the oxygenating activity of the fungus does not appear to be critical. For example, the 17α,21-dihydroxy-4-pregnene-3,20-dione can be added either before sterilization of the medium, at the time of inoculating the medium with the selected Mucorales species, or at some time, e. g. 24 to 48 hours, later. The 17α,21-dihydroxy-4-pregnene-3,20-dione to be oxygenated may be added at any desired concentration although for practical reasons steroid substrate at a concentration of about 0.01 gram to 0.25 gram or up to about 0.6 gram per liter of media or even 0.8 gram per liter is satisfactory although higher concentrations may be used with some inhibition of oxygenating activity. The addition of steroid substrate to be oxygenated may be accomplished in any suitable manner so as to promote intimate contact of the steroid substrate with the oxygenating activity of the fungus and/or fungal enzymes, such as by dispersing the steroid substrate alone, with a dispersing agent, or in water-miscible organic solvent solution by mixing or homogenizing with the fungal medium to form a suspension or dispersion of fine steroid particles. Either submerged or surface culture procedures may be employed with facility, although submerged culture is preferred. Alternatively, the oxygenating activity or oxygenating enzymes of a growth of the fungus may be separated from the fungus or the medium, admixed with the steroid or a solution or suspension thereof, and the mixture subjected to aerobic conditions to accomplish oxygenation of the steroid.

The temperature employed during the period of oxygenation of the steroid need be maintained only within such ranges as support life, active growth or the oxygenating activity of the fungal organism.

While any form of aerobic incubation is satisfactory for the growth of the selected fungus or the bio-oxygenation of the steroid substrate, the efficiency of oxygenation is related to aeration. Therefore, controlled aeration, as by agitation and/or blowing air through the fermentation medium is usually employed.

The time required for the bio-oxygenation of the steroid varies according to the results desired. When the steroid substrate is present at the time of inoculation of the medium, periods of from eight to 72 hours may be used. However, when the steroid is added to the fungus, fungal medium, fungal enzymes, or the fermentation liquor after substantial aerobic growth of the fungal organism, e. g., after 16 to 24 hours, the conversion of the steroid substrate begins immediately and high yields are obtained in from one to 72 hours, 24 hours being satisfactory. In lieu of direct contact of the steroid to be oxygenated with the fermenting media containing viable Mucorales fungi, the steroid may be oxygenated by contact with the fermented liquor, free of fungi, or with the fungi or enzymes of Mucorales preferably in the presence of an aqueous menstruum, or with the enzymes obtained from the fungi.

After completion of the oxygenating fermentation reaction, the resulting 11,17α,21-trihydroxy-4-pregnene-3,20-dione is recovered from the fermentation reaction mixture. An especially advantageous manner of recovering the 11,17α,21-trihydroxy-4-pregnene-3,20-dione involves extracting the fermentation reaction mixture, including the fermentation liquor and mycelia in cases where the steroid is added directly to the culture, with a water-immiscible organic solvent, e. g. methylene chloride, ether, amyl acetate, and the like. The fermentation liquor and mycelia may be separated and separately extracted with suitable solvents. The combined extracts are desirably washed with mild alkaline solutions, and water, dried over anhydrous sodium sulfate, freed of solvent and purified by recrystallization from organic solvents or by chromatography.

The thus-produced 11,17α,21-trihydroxy-4-pregnene-3,20-dione crude fermentation product free of aqueous phase contaminants may be either purified and separated or directly, and without prior purification or separation, reacted with an acylating agent such as, for example, ketene, a ketene of a selected acid, an acid, acid chloride, acid anhydride, or other known acylating agent, usually in a solvent, illustratively benzene, toluene, or ether, and maintained at a temperature between about zero degrees centigrade and the boiling point of the reaction mixture, suitably at about room temperature, for a period of time between about one-half hour and about 100 hours. The time of reaction as well as the temperature at which the reaction is performed, the acylating agent, and the ratio of reactants may be varied. The reaction mixture may then be cooled or diluted by mixing with ice or cold water, and the product collected in an appropriate solvent which is thereafter washed with successive portions of a mildly basic solution and water to obtain a solution of the product which is essentially neutral. After drying the solvent, the acylated 11,17α,21-trihydroxy-4-pregnene-3,20-dione may be isolated by evaporation of the solvent, and the residual product may be either directly oxidized to 21-acyloxy-17α-hydroxy-4-pregnene-3,11,20-trione or it may be first purified by conventional procedures, such as, for example, by recrystallization or chromatographic purification.

The thus-described acylation process, as illustrated in greater detail in the examples following in this specification, produces both the mono-esters and the di-esters, although in different proportions depending upon the proportions of acylating agent to 11,17α,21-trihydroxy-4-pregnene-3,20-dione. Using approximately one equivalent of acylating agent to said steroid produces predominantly the mono-acylated product, whereas with about two or more equivalents of acylating agent to said steroid, the diacylated product has a greater tendency to form.

Either the crude or purified 21-acyloxy-11,17α-dihydroxy-4-pregnene-3,20-dione may be oxidized with an oxidizing agent, illustratively chromium trioxide, to a 21-acyloxy ester of cortisone (21-acyloxy-17α-hydroxy-4-pregnene-3,11,20-trione) the production of which is an additional object of the present invention and is shown in the examples.

The following preparations and examples are illustrative of the process and products of the present invention and are not to be construed as limiting.

PREPARATION 1

11α,17α,21-trihydroxy-4-pregnene-3,20-dione

A medium was prepared of twenty grams of Edamine enzymatic digest of lactalbumin, three grams of corn steep liquor and fifty grams of technical dextrose diluted to one liter with tap water and adjusted to a pH of 4.3 to 4.5. Four liters of this sterilized medium was inoculated with *Rhizopus nigricans* minus strain, American Type Culture Collection No. 6227b, and incubated for 24 hours at a temperature of 28 degrees centigrade using a rate of aeration and stirring such that the oxygen uptake was 6.3 to 7 millimoles per liter per hour of $Na_2SO_3$ according to the method of Cooper, Fernstrom and Miller, Ind. Eng. Chem., 36, 504 (1944). To this medium containing a 24 hour growth of *Rhizopus nigricans* minus strain was added two grams of 17α,21-dihydroxy-4-pregnene-3,20-dione (Reichstein's Substance S) in 50 milliliters of acetone to provide a suspension of the steroid in the culture. After an additional 96 hour period of incubation under the same conditions of temperature and aeration, the beer and mycelium were extracted. The mycelium was filtered, washed twice, each time with a volume of acetone approximately equal to the volume of the mycelium and extracted twice, each time with a volume of methylene chloride approximately equal to the volume of the mycelium. The acetone and methylene chloride extracts including solvent were added to the beer filtrate. The mixed extracts and beer filtrate were extracted successively with two one-half by volume portions of methylene chloride and then with two one-fourth by volume portions of methylene chloride. The combined methylene chloride extracts were washed with two one-tenth by volume portions of a two percent aqueous solution of sodium bicarbonate and then with two one-tenth by volume portions of water. After drying the methylene chloride with about three to five grams of anhydrous sodium sulfate per liter of solvent and filtering, the solvent was removed by distillation. The semi-crystalline residue weighing 4.988 grams was triturated four times, each time with six milliliters of ice cold methylene chloride. Remaining insoluble was 630 milligrams of crystals melting at 194 to 199 degrees centigrade. Recrystallization of this with a mixture of three milliliters of methanol and ten milliliters of ether resulted in 404 milligrams of crystals melting at 205 to 210 degrees centigrade. Two recrystallizations from the same solvents above gave 132 milligrams of 11α,17α,21-trihydroxy-4-pregnene-3,20-dione having a constant melting point of 209 to 212 degrees centigrade, and depending upon its crystal form, of 217 to 219 degrees centigrade, $[\alpha]_D^{24}$ of plus 113 degrees (1.568 in methanol).

*Analysis.*—Calculated for $C_{21}H_{30}O_3$: C, 69.58; H, 8.35. Found: C, 69.26; H, 8.34.

PREPARATION 2

11α,17α,21-trihydroxy-4-pregnene-3,20-dione

In the same manner as in Preparation 1, 17α-hydroxy-21-acetoxy-4-pregnene-3,20-dione is converted to 11α,17α,21-trihydroxy-4-pregnene-3,20-dione by the action of *Rhizopus nigricans*.

PREPARATION 3

11β,17α,21-trihydroxy-4-pregnene-3,20-dione

A medium was prepared from 0.5 percent peptone, two percent dextrose, 0.5 percent soybean meal, 0.5 percent $KH_2PO_4$, 0.5 percent sodium chloride and 0.3 percent yeast extract in tap water. To 200 milliliters of this sterilized medium was added an inoculum of the vegetative mycelia of *Cunninghamella blakesleeana*. The spores had first been transferred from a spore slant to a broth medium and the broth medium was aerobically incubated at 24 degrees centigrade for 24 to 72 hours in a reciprocating shaker until the development of vegetative growth. The inoculated medium containing added vegetative mycelia of *Cunninghamella blakesleeana* was incubated for 48 hours at 24 degrees centigrade following which was added 66 milligrams of compound S, 11-desoxy-17-hydroxycorticosterone in solution in a minimum of ethanol and incubation was maintained for seven hours at 24 degrees centigrade. The beer containing steroid was diluted with 800 milliliters of acetone, shaken one hour on a reciprocating shaker and filtered. The cake was suspended in 500 milliliters of acetone, shaken another hour and again filtered. The filtrates were combined and the acetone was volatilized under reduced pressure at fifty degrees centigrade. Acetone was then added, if necessary, to bring the concentration to twenty percent acetone and this resulting aqueous acetone solution was extracted five times each with one-third volume of Skellysolve B petroleum ether to remove fatty materials. These extracts were back washed two times with one-tenth volume of twenty percent aqueous acetone and the washings were added to the main acetone extract. The combined acetone extracts were extracted six times with one-fourth volumes of ethylene dichloride and the ethylene dichloride extract was evaporated under vacuum to leave the steroid residue. This steroid residue was taken up in a minimum of methylene chloride and applied to the top of a column packed with thirty grams of silica which had been previously triturated with 21 milliliters of ethylene glycol. Then various developing mixtures, saturated with ethylene glycol, were passed over the column. Cuts were made as each steroid was eluted as determined by the lowering of the absorption of light at 240 mμ, in accordance with Table I on the automatic chromatographic fraction cutter.

TABLE I.—AUTOMATIC CHROMATOGRAPHIC FRACTION CUTTER

| Band | Solvent | Tube No. (60 milliliters) | Crude Solids, Milligrams |
| --- | --- | --- | --- |
| 1 | cyclohexane | 1–4 | 11 |
| 2 | cyclohexane-methylene chloride 3:1 | 5–13 | 6.4 |
| 3 | cyclohexane-methylene chloride 1:1 | 14–16 | 3.0 |
| 4 | cyclohexane-methylene chloride 2:3 | 17–23 | 6.0 |
| 5 | cyclohexane-methylene chloride 1:4 | 24–38 | 12.2 |
| 6 | methylene chloride | 39–59 | 4.8 |

A 7.7 milligram portion of Band 5 was taken up in a minimum of acetone and refrigerated until crystals separated. This cold acetone mixture was centrifuged and the supernatant liquid removed by pipette. To the remaining crystals, a few drops of ice-cold ether-acetone, three to one mixture, were added, shaken, recentrifuged and the supernatant wash liquid removed by pipette. The ether-acetone wash was repeated. The resulting crystals were dried under vacuum yielding 3.3 milligrams of pure compound F, 17-hydroxycorticosterone also known as 11β,17α,21-trihydroxy-4-pregnene-3,20-dione.

Appreciable amounts of compound E, 11-dehydro-17-hydroxy-corticosterone, cortisone, are also produced in the above preparation.

PREPARATION 4

11β,17α,21-trihydroxy-4-pregnene-3,20-dione

The spores of *Cunninghamella blakesleeana* were transferred from an agar slant to a broth medium and aerobically incubated at 24 degrees centigrade for 24 to 72 hours in a reciprocating shaker until the development of vegetative growth.

Six hundred milliliters of this vegetative growth was used to inoculate twelve liters of a sterile medium containing 120 grams of dextrin, 480 grams of corn steep solid, twelve grams of calcium carbonate and sixty grams of sodium chloride which was made to twelve liters with tap water and adjusted to pH 6.5 with sodium hydroxide before sterilization. The inoculated medium was incubated at 26 degrees centigrade in a five gallon bottle with stirring and aeration for 48 hours.

The seed thus prepared was added aseptically to 240 liters of a sterile medium prepared from 0.5 percent soybean meal, two percent dextrose, 0.5 percent dried brewers yeast, 0.5 percent sodium chloride, 0.5 percent $KH_2PO_4$ made to volume with tap water and adjusted to pH 6.4. Fifty cubic feet of air per hour was passed through the stirred medium for seventeen hours at which time the pH was 6.1. Then twelve grams of 17α,21-dihydroxy-4-pregnene-3,20-dione in eight liters of redistilled ethanol which had been sterilized by ultrafine sintered glass filtration was added and the incubation continued for 11.5 hours.

Four kilograms of diatomaceous earth was added to the beer, the mixture was passed through a filter press and the cake then washed with forty liters of tap water. The clear filtrate was extracted with three fifty liter portions of ethylene dichloride. The extract was then concentrated under vacuum in a nitrogen atmosphere at fifty degrees centigrade to a volume of 600 milliliters.

Three hundred grams of magnesium silicate was poured into acetone contained in a chromatographic column 4.5 centimeters in diameter and 36 centimeters long. The acetone was replaced with ethylene dichloride and the column washed with two liters of ethylene dichloride. The ethylene dichloride concentrate was added to the top of the column and developed with ten liters of dry ethylene dichloride. The adsorbed steroids were then eluted from the column with two liters of dry acetone. After removal of the acetone at fifty degrees centigrade under nitrogen, the residue was taken up in 200 milliliters of ethyl acetate and washed twice with fifty milliliters of an equal volume mixture of a two percent aqueous sodium carbonate solution and a three percent aqueous sodium bicarbonate solution. The extract was then washed with fifty milliliter portions of water until the washes were neutral. The combined water washes were back extracted with thirty milliliters of ethylene dichloride and this together with a further 100 milliliters of the same solvent were added to the ethyl acetate solution of the steroids. Evaporation of the mixed solvents under anaerobic conditions at low temperature left a friable brown mass. The latter material was dissolved in 100 milliliters of chloroform, chilled to four degrees centigrade. The crystals which formed were removed by filtration and dried in vacuum to give 4.03 grams of steroids containing 2.41 grams of 11β,17α,21-trihydroxy-4-pregnene-3,20-dione and 1.19 grams of cortisone.

The mother liquor, upon concentration, gave an additional 834 milligrams of crystals containing 164 milligrams of 11β,17α,21-trihydroxy-4-pregnene-3,20-dione and 433 milligrams of cortisone.

EXAMPLE 1

*21-acetoxy-11α,17α-dihydroxy-4-pregnene-3,20-dione*

A 500-milligram sample of 11α,17α,21-trihydroxy-4-pregnene-3,20-dione was dissolved in four milliliters of pyridine. To this solution 155 milligrams of acetic anhydride was added dropwise. The reaction mixture was kept at room temperature 24 hours and then diluted with seventy milliliters of ice cold water, followed by extraction twice with fifty milliliters and twice with 25 milliliters of methylene dichloride. The extract was washed with two 25 milliliter portions of five percent hydrochloric acid, with 25 milliliters of ten percent sodium bicarbonate solution, and with water to neutrality. The extract was dried with anhydrous sodium sulfate and the solvent evaporated. The oily residue was dissolved in 125 milliliters of ethylene dichloride and chromatographed over eight grams of Florisil synthetic magnesium silicate. Solvents used to develop the column were in 100-milliliter portions in the following order: 1 and 2 ethylene dichloride, 3 to 5 ethylene dichloride with acetone 25:1 ratio respectively by volume, 6 and 7 ethylene dichloride with acetone 15:1 ratio, 8 to 11 ethylene dichloride with acetone 12:1 ratio, 12 to 14 ethylene dichloride with acetone 10:1 ratio, 15 to 18 ethylene dichloride with acetone 8:1 ratio, 19 and 20 ethylene dichloride with acetone 5:1 ratio, 21 to 23 ethylene dichloride with acetone 2:1 ratio, 24 and 25 acetone.

Chromatographic fractions fifteen through twenty were combined, and the solvent was then evaporated to yield 162 milligrams of 21-acetoxy-11α,17α-dihydroxy-4-pregnene-3,20-dione.

EXAMPLE 2

*11α,21-diacetoxy-17α-hydroxy-4-pregnene-3,20-dione*

Fractional extracts, number eight to eleven inclusive, from the chromatographic development in Example 1 were freed of solvent, by evaporation, combined and recrystallized from acetone by dropwise addition of petroleum ether. Three recrystallizations yielded 35 milligrams of 11α,21-diacetoxy-17α-hydroxy-4-pregnene-3,20-dione, melting at 198 to 202 degrees centigrade, $[\alpha]_D^{22}$ of plus 115 degrees (1.145 in chloroform), $k_{240}$ equal to 33.33. Infrared spectrum verified the indicated structure.

*Analysis.*—Calculated for $C_{25}H_{24}O_7$: C, 67.24; H, 7.67. Found: C, 67.43; H, 7.94.

EXAMPLE 3

*21-acetoxy-11β,17α-dihydroxy-4-pregnene-3,20-dione*

To a solution of 500 milligrams of 11β,17α,21-trihydroxy-4-pregnene-3,20-dione in five milliliters of pyridine, 150 milligrams of acetic anhydride was added dropwise. After being maintained at room temperature for 24 hours, the reaction mixture was diluted with 75 milliliters of ice-cold water, and the diluted mixture was extracted twice with fifty-milliliter portions of cold ether and twice with 25-milliliter portions of methylene chloride. The combined extracts were washed with two 25-milliliter portions of cold five percent hydrochloric acid, with 25 milliliters of two percent sodium bicarbonate solution, and with water to neutrality. The washed extract was dried over anhydrous sodium sulfate, filtered, and the solvent evaporated. Recrystallization from acetone by the dropwise addition of petroleum ether produced 21-acetoxy-11β,17α-dihydroxy-4-pregnene-3,20-dione.

EXAMPLE 4

*21-propionyloxy-11α,17α-dihydroxy-4-pregnene-3,20-dione and 11α,21-dipropionyloxy-4-pregnene-3,20-dione*

Following the procedure of Example 1, using the equivalent proportion of propionic anhydride in place of acetic anhydride and separating by chromatography produced 21 - propionyloxy - 11α,17α - dihydroxy - 4 - pregnene-3,20 - dione and 11α,21 - dipropionyloxy - 17α - hydroxy-4-pregnene-3,20-dione.

EXAMPLE 5

*21-propionyloxy-11β,17α-dihydroxy-4-pregnene-3,20-dione*

Following the procedure of Example 3, using the equivalent proportion of propionic anhydride in place of acetic anhydride, produced 21-propionyloxy-11β,17α-dihydroxy-4-pregnene-3,20-dione.

EXAMPLE 6

*21 - trimethylacetoxy - 11α,17α - dihydroxy-4-pregnene-3,20-dione and 11α,21 - di(trimethylacetoxy)-17α-hydroxypregnene-3,20-dione*

To one gram of 11α, 17α,21-trihydroxy-4-pregnene-3,20-dione dissolved in ten milliliters of freshly distilled pyridine was added dropwise 300 milligrams of trimethylacetyl chloride. The reaction mixture was maintained at room temperature for 24 hours and then quenched with 150 milliliters of ice-cold water. Extraction and chromatographic separation, as in Example 1, produced 21-trimethylacetoxy-11α,17α-dihydroxy - 4 - pregnene - 3,20- dione and 11α,21-di(trimethylacetoxy)-17α-hydroxy-4-pregnene-3,20-dione.

EXAMPLE 7

*21 - β - cyclopentylpropionyloxy - 11α,17α - dihydroxy - 4 - pregnene - 3,20 - dione and 11α,21 - di - β - cyclopentylpropionyloxy - 17α - hydroxy - 4 - pregnene-3,20-dione*

Following the procedure of Example 6, using the equivalent proportion of β-cyclopentylpropionyl chloride in place of trimethylacetyl chloride produced 21-β-cyclopentylpropionyloxy - 11α,17α - dihydroxy - 4 - pregnene-3,20 - dione and 11α,21 - di - β - cyclopentylpropionyloxy-17α-hydroxy-4-pregnene-3,20-dione.

EXAMPLE 8

*21 - benzoxy - 11α,17α - dihydroxy - 4 - pregnene - 3,20-dione and 11α,21 - dibenzoxy - 17α - hydroxy - 4-pregnene - 3,20 - dione*

Following the procedure of Example 6, using the equivalent proportion of benzoyl chloride in place of trimethylacetyl chloride produced 21-benzoxy-11α,17α-dihydroxy - 4 - pregnene - 3,20 - dione and 11α,21 - dibenzoxy-17α-hydroxy-4-pregnene-3,20-dione.

Other mono-esters and di-esters of 11α,17α,21-trihydroxy-4-pregnene-3,20-dione and mono-esters of 11β,17α-21-trihydroxy-4-pregnene-3,20-dione are prepared according to various acylation procedures such as illustrated in the examples, or by reaction with ketene, ketenes of selected acids, selected acids, acid anhydrides, or acid chlorides, in an organic solvent such as pyridine or the like. Representative 21-acyloxy-11α,17α-dihydroxy-4-pregnene-3,20 - diones, 11α,21 - diacyloxy - 17α - hydroxy - 4-pregnene - 3,20 - diones, and 21 - acyloxy - 11β,17α-dihydroxy-4-pregnene-3,20-diones thus-prepared include one to eight carbon atom carboxylic acid acyloxy esters of saturated or unsaturated aliphatic, carbocyclic, cycloaliphatic, aryl, arylalkyl, alkaryl, mono, di or polycarboxylic acids which form ester groups such as, for example, formyloxy, acetoxy, propionyloxy, dimethylacetoxy, trimethylacetoxy, butyryloxy, valeryloxy, hexanoyloxy, heptanoyloxy, octanoyloxy, benzoxy, phenylacetoxy, toluoyloxy, napthoyloxy, cyclopentylformyloxy, β-cyclopentylpropionyloxy, acrylyloxy, cyclohexylformyloxy, the half and di-esters of malonic, maleic, succinic, glutaric and adipic acids, and the like. The acids may also contain non-interfering substituents, such as mono or poly halo, chloro, bromo, hydroxy, methoxy, and the like, if desired.

If a mixed ester involving two different acyl groups is desired, the 11α,17α,21-trihydroxy-4-pregnene-3,20-dione may be partially esterified with one acylating agent and the resulting mono-ester may then be completely esterified with an acylating agent which introduces a different acyl group. Thus 11α-propionyloxy-21-β-cyclopentylpropionyloxy - 17α - hydroxy - 4 - pregnene - 3,20-dione or other mixed esters of the herein mentioned acid groups may be prepared.

EXAMPLE 9

*Cortisone acetate*

162 milligrams of 21-acetoxy-11α,17α-dihydroxy-4-pregnene-3,20-dione, obtained in Example 1, was dissolved in ten milliliters of glacial acetic acid and oxidized by adding dropwise a solution of thirty milligrams of chromium trioxide ($CrO_3$) in 0.5 milliliter of water and two milliliters of acetic acid. After six hours at room temperature, the green solution was diluted with twenty milliliters of methanol and evaporated under reduced pressure. The crystalline residue was suspended in 25 milliliters of ten percent sodium bicarbonate solution and extracted with four 25 milliliter portions of a mixture of four parts of ether to one part of chloroform by volume. The extract was washed thrice with water and dried over anhydrous sodium sulfate.

The resultant crystalline oxidation product weighed 166 milligrams. Recrystallization from acetone yielded 138.5 milligrams of compound E acetate, 17α-hydroxy-21-acetoxy-4-pregnene-3,11,20-trione, otherwise known as cortisone acetate, with a melting point of 243 to 245 degrees centigrade, $k_{238}$ equal to 36.33, $[\alpha]_D^{23}$ of plus 169 degrees (0.3657 in chloroform).

*Analysis.*—Calculated for $C_{23}H_{30}O_6$, C, 68,61; H, 7.52. Found: C, 68.52; H, 7.61.

In a similar manner, oxidizing the herein described 21 - acyloxy - 11α,17α - dihydroxy - 4 - pregnene - 3,20-diones or 21-acyloxy-11β,17α-dihydroxy-4-pregnene-3,20-diones with, for example, chromium trioxide in acetic acid produces the corresponding acid esters of cortisone, 21 - acyloxy - 17α - hydroxy-4-pregnene-3,11,20-triones wherein the acyloxy group is the same as that in the starting 21 - acyloxy - 11,17α - dihydroxy - 4 - pregnene-3,20-diones.

It is to be understood that the invention is not to be limited to the exact details of operation or exact organisms and compounds shown and described, as obvious modifications and equivalents will be apparent to one skilled in the art, and the invention is therefore to be limited only by the scope of the appended claims.

We claim:

1. Δ⁴-pregnene-11α,17α,21-triol-3,20-dione of the formula:

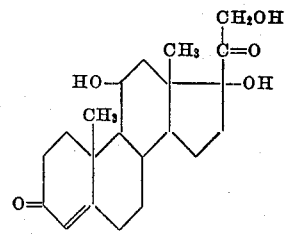

2. A compound from the group consisting of 11α,-17α,21-trihydroxy-4-pregnene-3,20-dione and the esters thereof of carboxylic acid containing not more then ten carbon atoms selected from the class consisting of hydrocarbon carboxylic acids, halohydrocarbon carboxylic acids, hydroxyhydrocarbon carboxylic acids, and methoxyhydrocarbon carboxylic acids.

3. An 11α,17α,21 - trihydroxy-4-pregnene-3,20 - dione ester of a hydrocarbon carboxylic acid containing not more than ten carbon atoms in which the acyl group may contain non-interfering substituents selected from the class consisting of halo, hydroxy, and methoxy.

4. An 11α,17α,21 - trihydroxy-4-pregnene-3,20 - dione ester of a hydrocarbon carboxylic acid containing from one to ten carbon atoms.

5. An 11α,17α,21 - trihydroxy-4-pregnene-3,20 - dione ester of a hydrocarbon carboxylic acid containing from one to eight carbon atoms inclusively and selected from the group consisting of aliphatic acids and carbocyclic acids.

6. An ester of 11α,17α,21-trihydroxy-4-pregnene-3,20-dione and a lower alkanoic acid.

7. 21-lower alkanoyloxy - 11α,17α - dihydroxy-4-pregnene-3,20-dione.

8. An acetate of Δ⁴-pregnene-11α,17α,21-triol-3,20-dione.

9. 21 - acetoxy - 11α,17α - dihydroxy-4-pregnene-3,20-dione.

10. 11α,21-diacetoxy - 17α - hydroxy-4-pregnene-3,20-dione.

11. A propionic acid ester of 11α,17α,21-trihydroxy-4-pregnene-3,20-dione.

12. 21 - propionoxy - 11α,17α-dihydroxy-4-pregnene-3,20-dione.

13. A trimethylacetic acid ester of 11α,17α,21-trihydroxy-4-pregnene-3,20-dione.

14. An ester of 11α,17α,21-trihydroxy-4-pregnene-3,20-dione and a lower cycloalkanoic acid.

15. 21-lower cycloalkanoyloxy - 11α,17α - dihydroxy-4-pregnene-3,20-dione.

16. A β-cyclopentylpropionic acid ester of 11α,17α,21-trihydroxy-4-pregnene-3,20-dione.

17. A process for the production of an 11α,17α,21-trihydroxy-4-pregnene-3,20-dione ester of a carboxylic acid comprising reacting 11α,17α,21-trihydroxy-4-pregnene-3,20-dione with a carboxylic acid acylating agent.

18. A process for the production of 21-acetoxy-11α,17α-dihydroxy-4-pregnene-3,20-dione comprising reacting 11α,17α,21-trihydroxy-4-pregnene-3,20-dione with acetic anhydride.

References Cited in the file of this patent

UNITED STATES PATENTS

| | | |
|---|---|---|
| 2,183,589 | Reichstein et al. | Dec. 19, 1939 |
| 2,602,769 | Murray et al. | July 8, 1952 |